US010934097B2

(12) United States Patent
Warner et al.

(10) Patent No.: US 10,934,097 B2
(45) Date of Patent: Mar. 2, 2021

(54) CONVEYOR SKIRT SYSTEM

(71) Applicant: CPC ENGINEERING PTY LTD, West Perth (AU)

(72) Inventors: Graham Trevor Warner, Wellard (AU); Ronald Thomas Bell, Orange (AU); Brad Michael John Lloyd, Ellenbrook (AU)

(73) Assignee: CPC ENGINEERING PTY LTD, West Perth (AU)

( * ) Notice: Subject to any disclaimer, the term of this patent is extended or adjusted under 35 U.S.C. 154(b) by 0 days.

(21) Appl. No.: 16/643,020

(22) PCT Filed: Aug. 28, 2018

(86) PCT No.: PCT/AU2018/050917
§ 371 (c)(1),
(2) Date: Feb. 28, 2020

(87) PCT Pub. No.: WO2019/040980
PCT Pub. Date: Mar. 7, 2019

(65) Prior Publication Data
US 2020/0198898 A1    Jun. 25, 2020

(30) Foreign Application Priority Data
Aug. 28, 2017   (AU) ................................ 2017903475

(51) Int. Cl.
*B65G 21/20*        (2006.01)
*B65G 21/02*        (2006.01)
*B65G 41/00*        (2006.01)
*B65G 15/08*        (2006.01)

(52) U.S. Cl.
CPC ......... *B65G 21/2081* (2013.01); *B65G 41/00* (2013.01); *B65G 15/08* (2013.01); *B65G 2201/042* (2013.01); *B65G 2207/40* (2013.01); *B65G 2207/48* (2013.01)

(58) Field of Classification Search
None
See application file for complete search history.

(56) References Cited

U.S. PATENT DOCUMENTS 4,789,056 A * 12/1988 Bourbeau .............. B65G 15/62
198/823
5,267,642 A * 12/1993 Gharpurey ......... B65G 21/2081
198/836.1

(Continued)

OTHER PUBLICATIONS

International Search Report and Written Opinion of the International Searching Authority issued in PCT/AU2018/050917, dated Oct. 29, 2018; ISA/AU.

*Primary Examiner* — Kavel Singh
(74) *Attorney, Agent, or Firm* — Harness, Dickey & Pierce, P.L.C.

(57) ABSTRACT

In accordance with the present invention, there is provided a conveyor skirt system, the system comprising: a support member; a series of skirting panels releasably fixed to the support member; a rail assembly positioned outside the conveyor, extending in a direction substantially parallel to the direction of the conveyor; and a trolley assembly mounted on the rail assembly, the trolley assembly being adapted to engage and support one or more of the skirting panels.

20 Claims, 5 Drawing Sheets

(56) References Cited

U.S. PATENT DOCUMENTS

| | | | |
|---|---|---|---|
| 7,571,802 B2* | 8/2009 | Bowman | B65G 21/2081 198/836.1 |
| 7,789,220 B2* | 9/2010 | Bell | B65G 21/2081 198/836.1 |
| 8,006,830 B2* | 8/2011 | Swinderman | B65G 21/2081 198/836.1 |
| 2004/0031666 A1 | 2/2004 | Ostman | |

* cited by examiner ial Application No. PCT/
CONVEYOR SKIRT SYSTEM

CROSS REFERENCE TO RELATED APPLICATIONS

This application is a U.S. National Phase Application under 35 U.S.C. 371 of International Application No. PCT/AU2018/050917 filed on Aug. 28, 2018, which claims the benefit of priority from Australian Patent Application No. 2017903475 filed on Aug. 28, 2017. The entire disclosures of all of the above applications are incorporated herein by reference.

TECHNICAL FIELD

The present invention relates to a conveyor skirt system. More preferably, the conveyor skirt system of the present invention is intended to allow for the replacement of the conveyor skirt liner without the need for an operator inside the conveyor transfer area.

BACKGROUND ART

The following discussion of the background art is intended to facilitate an understanding of the present invention only. The discussion is not an acknowledgement or admission that any of the material referred to is or was part of the common general knowledge as at the priority date of the application.

In order to transfer bulk materials a conveyor system is often used. Such conveyor systems comprise a belt that extends in a continuous loop around rollers and pulleys. The upper portion of the loop can be referred to as a transfer area and the lower portion of the loop can be referred to as a return run. Bulk material is loaded onto the transfer area and is carried along by the conveyor system.

As the bulk material is typically particulate in nature, it is also common to heap the bulk material near the centerline of the belt, while keeping such bulk material from spilling off the edges of the belt. To prevent such spillage, most conveyor systems comprise rigid skirts that are provided along each edge of the transfer area for purposes of redirecting stray bulk material and retaining such material on the belt.

Because many types of bulk materials are abrasive, it is also common practice to attach wear liners to the skirts. In this manner, the wear liners prevent the direct contact of the skirts with the bulk material. Over time, the wear liners degrade from direct contact with the moving bulk material and periodically must be replaced.

It is common practice to mount the wear liners on the face of the skirt that faces the centerline or center plane of the belt. Since the cross section of the belt is often trough-shaped, it is also common for the lower edge of a wear liner to be positioned lower than the lower edge of skirt so as to reduce the gap between the lower edge of the wear liner and the belt and to prevent wear to the backing plate of the skirt.

Due to the fact that wear liners are mounted to the side of the skirt facing the center plane of the belt (the inward side), skirting replacement or maintenance is typically carried out by two work crews, one inside the chute/transfer area manipulating the liners in and out of place and the other crew outside chute/transfer area removing and replacing fasteners. Having an operator enter the chute/transfer area presents a significant safety risk.

Whilst several proposed solutions have been developed that seek to limit the amount of interaction required from inside the transfer area, there is often still a need for an operator to place their hands inside the transfer area, albeit from the outside, to replace components. This leads to difficulties in positioning the wear liners accurately, and presents a risk of injury.

SUMMARY OF INVENTION

In accordance with the present invention, there is provided a conveyor skirt system, the system comprising:
 a support member;
 a series of skirting panels releasably fixed to the support member;
 a rail assembly positioned outside the conveyor, extending in a direction substantially parallel to the direction of the conveyor; and
 a trolley assembly mounted on the rail assembly, the trolley assembly being adapted to engage and support one or more of the skirting panels.

Preferably, each skirting panel has a wear liner attached thereto.

Preferably, the arrangement of the trolley assembly and the rail assembly allows the trolley assembly to move along the length of the rail assembly in either direction.

It is envisaged that the conveyor skirt system of the present invention will allow for the simple replacement of the skirting panels. Preferably, the trolley assembly is adapted to move along the rail assembly to a position adjacent to the skirting panel to be replaced. Once in position, the trolley assembly will engage and support the skirting panel, allowing the skirting panel to be unfastened from the support member. Once the skirting panel is mounted and correctly located on the trolley assembly, it can then be moved along the rail assembly, clear of the conveyor. Once clear of the conveyor, the skirting panel may be repaired or replaced outside of the confines of the conveyor.

Preferably, the support member fixed relative to the conveyor. More preferably, the support member is coupled to the conveyor framework.

In one form of the present invention, the rail assembly comprises one or more rail tracks. Preferably, the one or more rail tracks are mounted on a rigid body member.

In one form of the present invention, the trolley assembly comprises a rail assembly engaging portion and a skirting panel engaging portion. Preferably, the rail assembly engaging portion is adapted to engage and move along the rail assembly. Preferably, the skirting panel engaging portion is adapted to engage a skirting panel.

Preferably, the rail assembly engaging portion comprises one or more rollers adapted to roll along the rail assembly.

In one form of the present invention, the skirting panel engaging portion comprises one or more engagement arms. Preferably, the one or more engagement arms are adapted to engage a skirting panel. More preferably, the one or more engagement arms are adapted to extend and retract.

In one form of the present invention, the skirting panel engaging portion comprises one or more body members. More preferably, the or each engagement arm is adapted to extend and retract with respect to at least one body member.

In one form of the present invention, the body member comprises a tube member. Preferably, each engagement arm is in the form of a tube. More preferably, each engagement arm is slidingly engaged with a tube member. Still preferably, the engagement arm is able to telescope inside the tube member. It is envisaged that the engagement between the tube member and the engagement arm, allows the engagement arm to be extended and retracted.

Preferably, the trolley assembly further comprises an actuation mechanism. More preferably, the extension and retraction of the engagement arm is actuated by the actuation mechanism. Still preferably, the actuation mechanism is a winch mechanism.

In one form of the present invention, where the trolley assembly comprises tube members and engagement tubes, actuation of the winch mechanism extends and retracts the engagement tube relative to the tube member.

In a preferred form of the present invention, the trolley assembly comprises a pair of engagement arms. Preferably, each of the engagement arms are adapted to engage with a skirting panel at different positions.

In one form of the present invention, each skirting panel has a working face and a rear face. Preferably, the wear liner is attached to the working face. More preferably, the trolley assembly engages with the rear face.

In one form of the present invention, each skirting panel is provided with one or more attachment means. Preferably, the rear face of each skirting panel is provided with one or more attachment means. More preferably, each attachment means is adapted to be engaged by the trolley assembly. Still preferably, where the trolley assembly comprises one or more engagement arms, each attachment means is adapted to be engaged by an engagement arm.

In one form of the present invention, the engagement of the trolley assembly and the attachment means is by way of a lock pin mechanism. Preferably, the lock pin mechanism will comprise a pin that will pass through apertures provided in both the trolley assembly and the attachment means.

In one form of the present invention, each attachment means comprises a mounting aperture adapted for engagement with the trolley assembly. More preferably, the mounting aperture is adapted for engagement with the one or more engagement arms. It is envisaged that each engagement arm can be affixed to the mounting apertures, thereby fastening the lower skirt panel to the trolley assembly.

In one form of the present invention, the attachment means comprises a mounting plate extending from the rear face of the skirting panel. More preferably, each mounting plate has provided therethrough at least mounting aperture. Still preferably, the mounting plate has two mounting apertures, being an upper mounting aperture and a lower mounting aperture.

Preferably, each engagement arm has provided at least one mounting aperture provided therethrough, the at least one mounting aperture adapted to engage with the rear face of each skirting panel. More preferably, the mounting plate has two mounting apertures, being an upper mounting aperture and a lower mounting aperture. Still preferably, the upper mounting aperture and the lower mounting aperture are offset in a horizontal direction.

Preferably, where the rear face of each skirting panel is provided with one or more attachment means, the at least one mounting aperture is adapted to engage with the one or more attachment means. More preferably, the engagement of the attachment means and the mounting aperture is by way of a lock pin mechanism.

In a preferred form of the present invention, the rear face of the each skirting panel is provided with one or more attachment means, each attachment means having an upper aperture and a lower aperture. Furthermore, each engagement arm is provided with an upper mounting aperture and a lower mounting aperture. Preferably, the upper aperture of the attachment means cooperates with the upper mounting aperture of the engagement arm. Likewise, the lower aperture of the attachment means cooperates with the lower mounting aperture of the engagement arm. Preferably, the engagement of the apertures is by way of respective upper and lower lock pin mechanisms.

As discussed above, each skirting panel is releasably fixed to the support member. In one form of the present invention, the skirt panels depend from the support member.

In one form of the present invention, an upper flange is provided on the rear face of each skirting panel. Preferably, each skirting panel is releasably fixed to the support member by way of the upper flange. More preferably, a lower flange is provided on the support member to co-operate with the upper flange of the skirting panel. Still preferably, one or more fastening means are provided through the lower flange on the support member and the upper flange of the skirting panel. Still preferably, the one or more fastening means are nuts and bolts.

In one form of the present invention, each skirting panel is releasably fixed to the adjacent skirting panel in the series. Preferably, opposed lateral flanges are provided on the rear face of each skirting panel. More preferably, one or more fastening means are provided through each lateral flange and the lateral flange on the adjacent skirting panel. Still preferably, the one or more fastening means are nuts and bolts.

In one form of the present invention, the support member comprises a series of upper skirting panels releasably fixed to each other. Preferably, opposed lateral flanges are provided on the rear face of each upper skirting panel. More preferably, one or more fastening means are provided through each lateral flange and the lateral flange on the adjacent upper skirting panel. Still preferably, the one or more fastening means are nuts and bolts.

In one form of the present invention, one or more wear liners are provided on the support member. Alternatively, where the support member comprises a series of upper skirting panels, a wear liner is fastened to each upper skirting panel.

In one form of the present invention, the rail assembly further comprises a lateral rail track orientated perpendicular to the direction of the rail track. Preferably, the lateral rail track is in communication with the rail track, such that the trolley assembly may move from the rail track to the lateral rail track. It is envisaged that the lateral rail track allows for the trolley assembly and the skirting panel to be moved in a lateral direction relative to the conveyor.

In accordance with a further aspect of the present invention, there is provided a method for using to conveyor skirt system as described above to replace a wear liner on a skirting panel of a conveyor.

In accordance with a further aspect of the present invention, there is provided a method for replacing a wear liner on a skirting panel of a conveyor, the method comprising the step of:

positioning a trolley assembly mounted on a rail assembly adjacent to the skirting panel with the wear liner to be replaced fastened thereto;

engaging the skirting panel with the trolley assembly and unfastening the skirting panel from the conveyor;

moving the trolley assembly and the skirting panel along the rail assembly to a position clear of the conveyor;

replacing the skirting panel and/or the wear liner;

moving the trolley assembly and the skirting panel along the rail assembly to a position suitable for mounting; and fastening to the skirting panel to the conveyor.

Preferably, the method for replacing a wear liner on a skirting panel of a conveyor utilises the conveyor skirt system as described above.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

DESCRIPTION OF EMBODIMENTS

Throughout this specification, unless the context requires otherwise, the word "comprise" or variations such as "comprises" or "comprising", will be understood to imply the inclusion of a stated integer or group of integers but not the exclusion of any other integer or group of integers.

Figure 1:
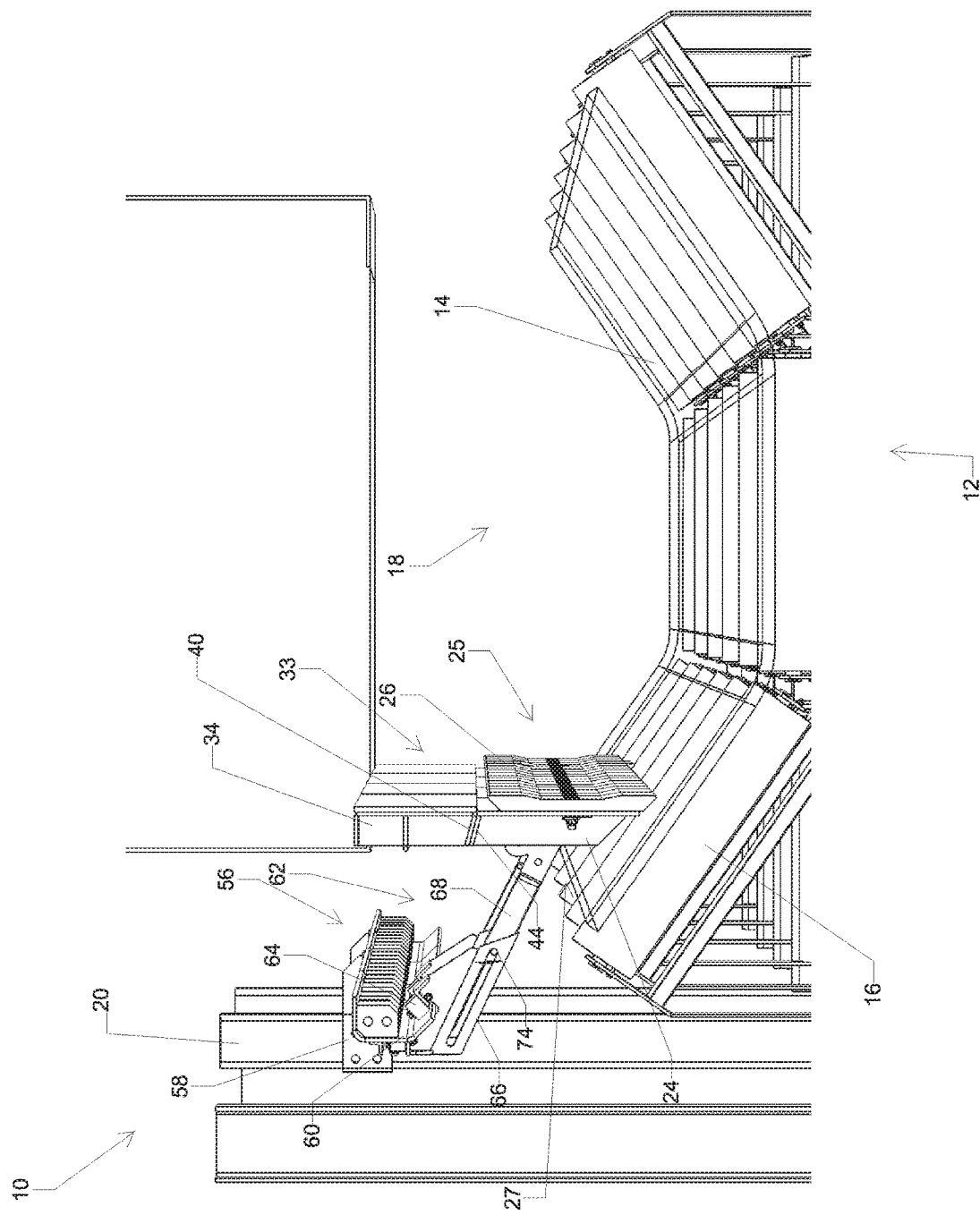
FIG. 1 is a front view of the conveyor skirt system of the present invention.
Figure 2:
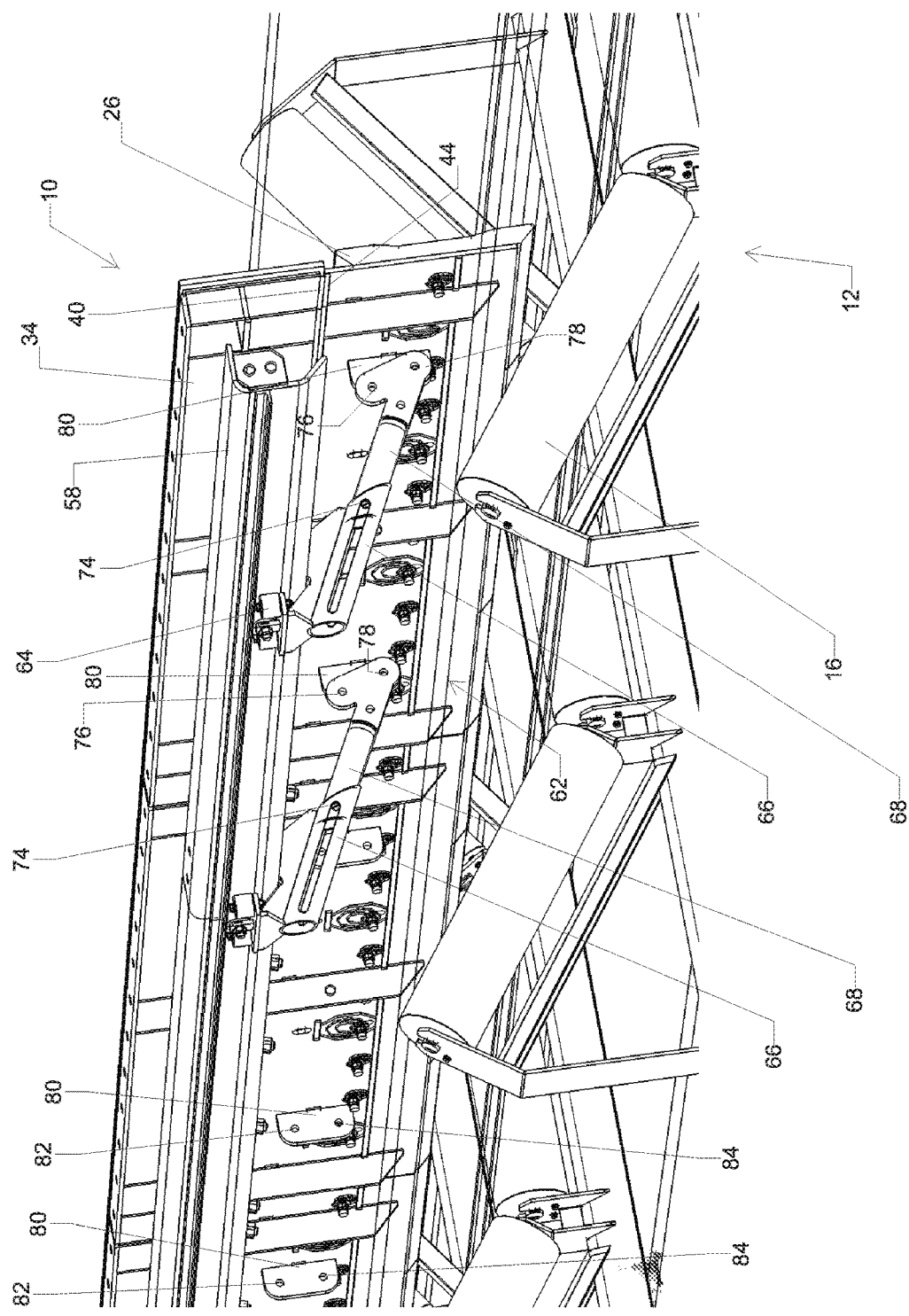
FIG. 2 is a rear perspective view of the conveyor skirt system of FIG. 1.
Figure 3A:
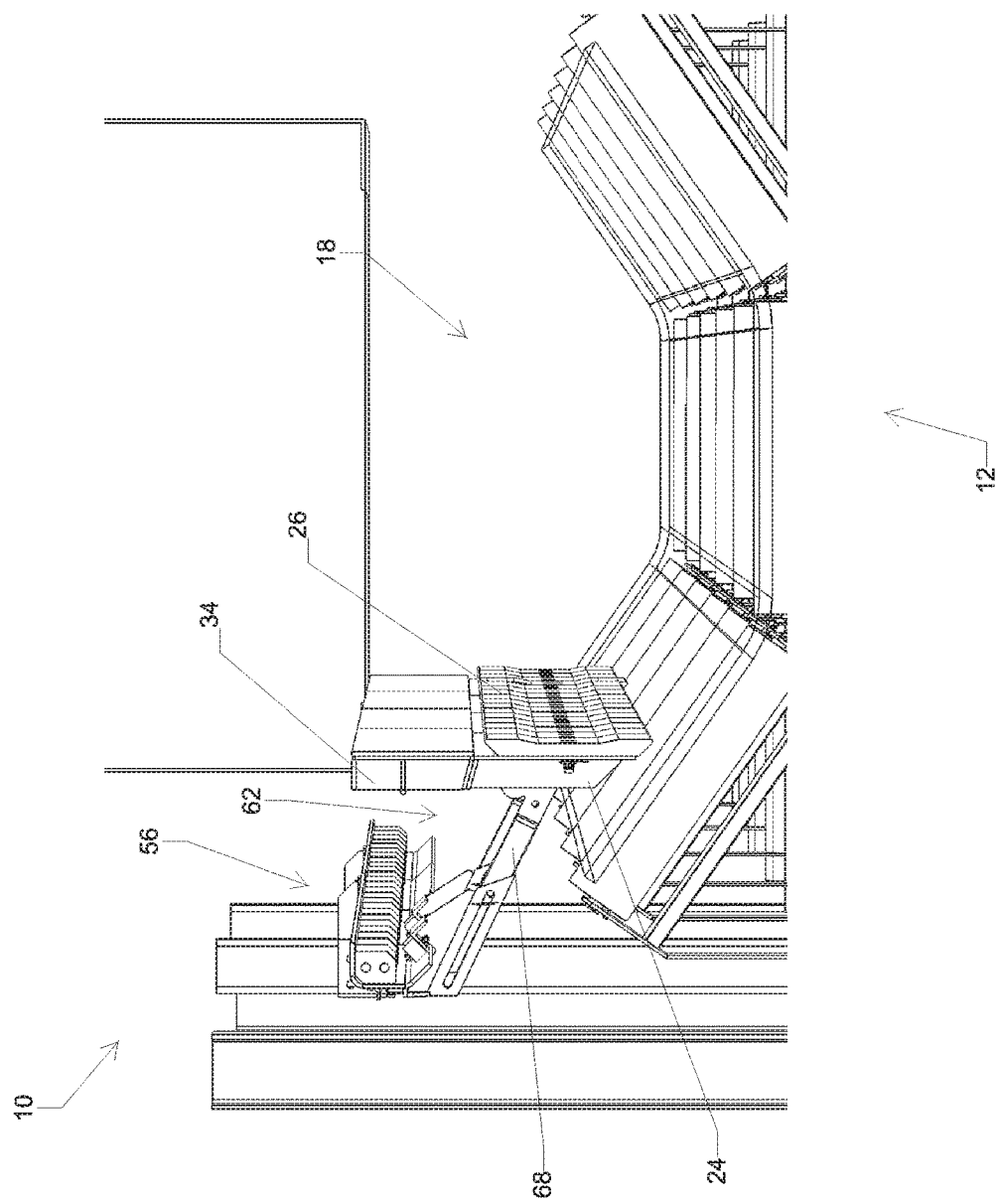
FIGS. 3(a)-(c) show a series of reverse perspective views of the conveyor skirt of the present invention demonstrating the removal of a skirting panel.
Figure 3B:
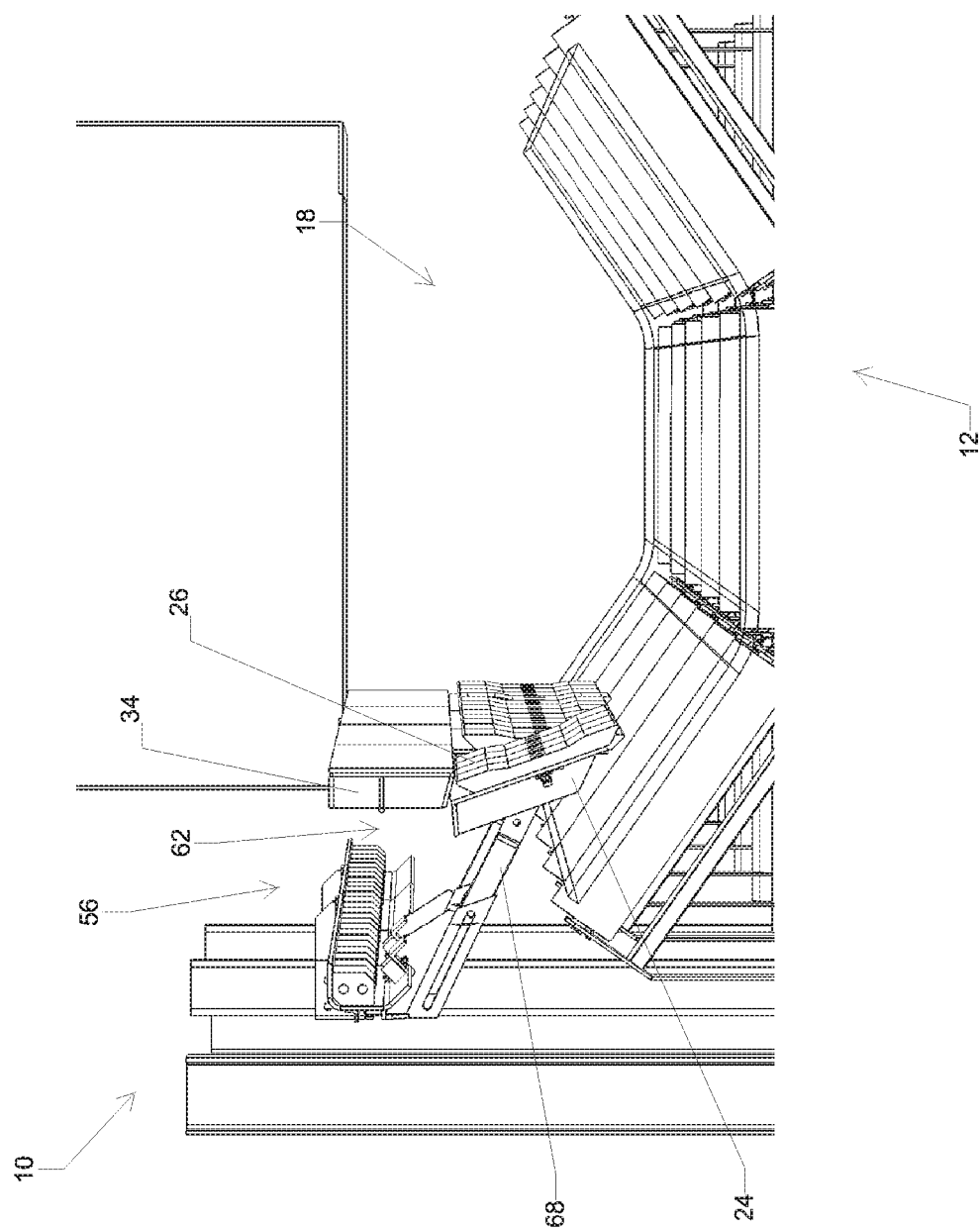
Figure 3C:
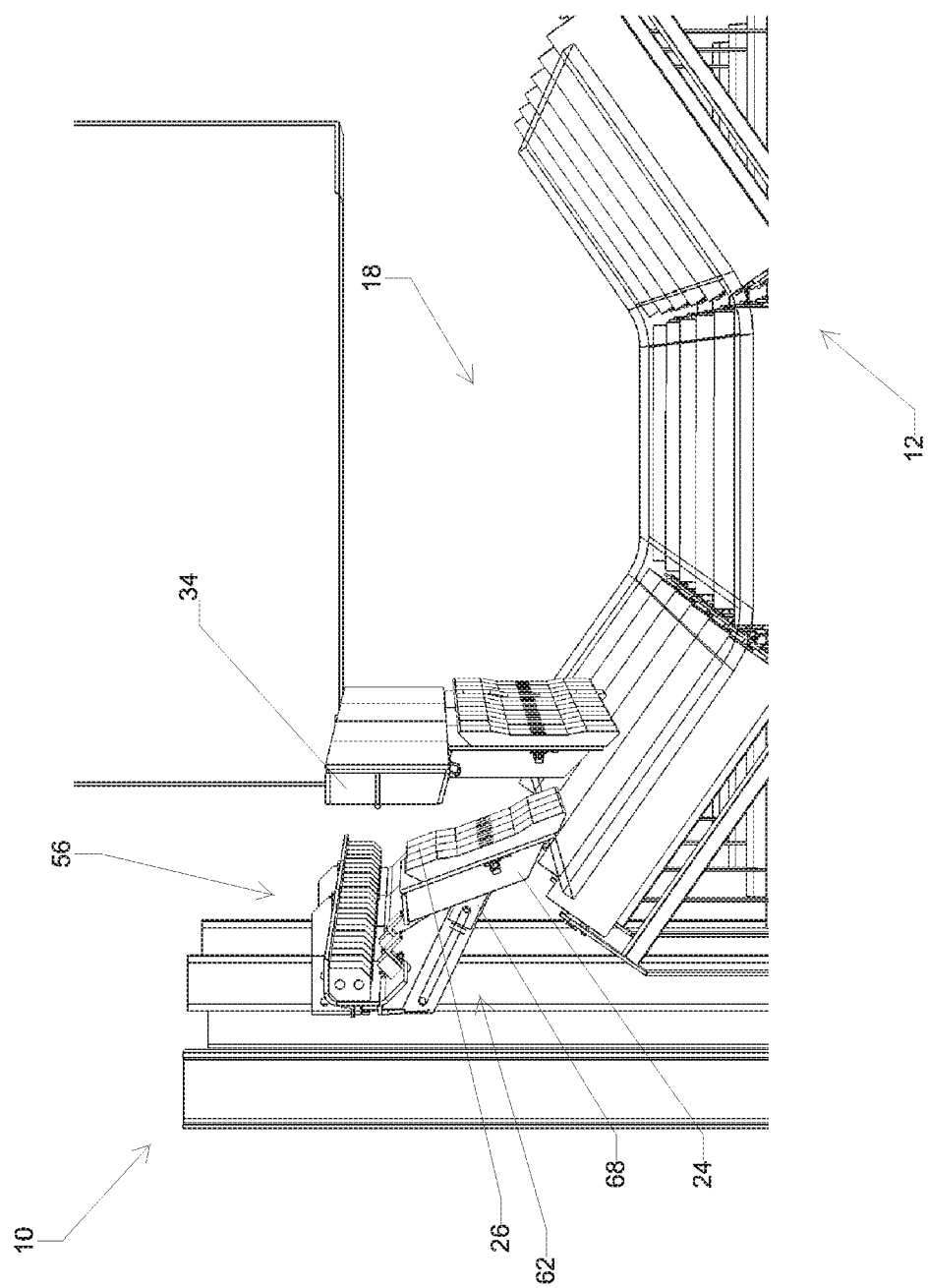

In FIGS. 1-3, there is shown a conveyor skirt system 10 in accordance with the present invention. The conveyor skirt system 10 is adapted to be used in association with a conventional conveyor 12. The conveyor 12 comprises a belt 14 that extends in a continuous loop around rollers and pulleys (not shown), in the known manner. As shown, the side edges of the belt 14 are canted upwardly by side support idler rollers 16, which are inclined as shown. An upper portion of the loop can be referred to as a transfer area 18. Bulk material (not shown) is loaded onto the transfer area 18 and is carried along the conveyor 12 by the belt 14. The conveyor 12 is typically supported on a framework 20.

As the bulk material is typically particulate in nature, it is necessary to ensure that the bulk material does not spill from the edge of the belt 14. To prevent such spillage, the conveyor skirt system 10 is positioned along the sides of the transfer area 18. The conveyor skirt system 10 acts to prevent or at least inhibit the migration of the bulk material outwardly from the transfer area 18.

The conveyor skirt system 10 comprises a series of skirting panels 24. Each skirting panel 24 has a working face 25 directed towards the transfer area 18. Similarly, each skirting panel 24 has a rear face 27. A wear liner 26 is fixed to the front face of each skirting panel 24. As shown in FIG. 2, the wear liner 26 is mounted on each skirting panel 24 by fasteners 28. As shown in the Figures, the series of skirting panels 24 are positioned such that a bottom edge 30 of each skirting panels 24 is close to the belt 14. Whilst some small bulk material may pass under the skirting panels 24, such material is prevented from escaping from the transfer area 18 by a rubber seal (not shown) positioned behind the rear face 27.

Each skirting panel 24 is releasably fixed to a support member 33. The support member 33 is coupled to the framework 20. In the embodiment shown in the Figures, the support member 33 comprises a series of upper skirting panels 34. A wear liner 26 is fixed to the front face of each upper skirting panel 34. It is envisaged that the support member could be any solid member capable of supporting the skirting panels 24. Such members include, for example, unitary beams. Furthermore, it is envisaged that the skirting panels 24 do not necessarily need to depend from the support member 33. Alternative embodiments include the skirt panels 24 being fixed to the front of the support member 33.

In the embodiment shown in the Figures, each upper skirting panel 34 is provided with side flanges 36 along the length of the side edges. The side flanges 36 are provided with apertures 38 that facilitate the location of bolts to fasten adjacent upper skirting panels 34 to one another.

The rear face 27 of the skirting panels 24 are provided with an upper flange 40 along the length of the top edge. In the embodiment shown in the Figures, the upper flange 40 spans the entire width of the skirting panels 24. A number of apertures 42 are provided through the upper flange 40 to facilitative the mounting of the skirting panels 24 to the support member 33. In the embodiment shown in the Figures, the upper skirting panels 34 are provided with a lower flange 44 along the periphery of the lower edge. The lower flanges 44 are provided with a number of apertures 46 to facilitate bolts 48 to fasten the skirting panels 24 to the upper skirting panels 34. It is envisaged that the embodiment shown in the Figures is particularly useful as it allows the skirting panels 24 to be unfastened from outside the transfer area 18. Advantageously, this allows the skirting panels 24 to be removed without requiring access to the inside of the transfer area 18.

Whilst not shown in the Figures, each skirting panel 24 may also be releasably fixed to its adjacent skirting panels 24. It is envisaged that each skirting panel 24 may be provided with side flanges along the length of the side edges. The side flanges could facilitate the location of bolts to fasten adjacent skirting panels 24 to one another. Alternatively, each skirting panel 24 could be provided with a mounting bracket that facilitates an engagement plate that could be fixed across the gap between two adjacent skirting panels 24.

The conveyor skirt system 10 further comprises a rail assembly 56. The rail assembly 56 comprises a rigid body member 58 extending in a direction parallel to the direction of the conveyor 12. A rail track 60 is disposed along the rigid body member 58. The rail assembly 56 is positioned exterior to the skirting panels 24 and on the outside of the transfer area 18. In the embodiment shown in the Figures, the rail assembly 56 it fixed to the conveyor 12 framework 20.

Mounted on the rail assembly 56 is a trolley assembly 62. The trolley assembly 62 comprises rollers 64 that engage with the rail track 60. The engagement of the rollers 62 and the rail track 60 allows for the trolley assembly 62 to roll along the rail assembly 56. It is envisaged that other means may be utilised to permit the sliding engagement of the trolley assembly 62 and the rail track 60. Such means include rack and pinion drives or slide pads.

In the embodiment shown in the Figures, the trolley assembly 62 further comprises tube members 66 and engagement arms 68. As seen in the Figures, the engagement arms 68 are tubular so as to permit the engagement arms 68 being received by the tube members 66. Whilst the trolley assembly 62 shown in the Figures comprises a pair of tube members 66 and engagement arms 68, it is envisaged that other configurations could also be utilised. For example, a single tube member 66 and single engagement arm 68 could be utilised. Alternatively, two engagement arms 68 could be mounted on bracket which has a single tube for engaging with a tube member 66 extending therefrom.

The arrangement of each tube member 66 and engagement arm 68 allows for the engagement arm 68 to extend from the tube member 66 towards the skirting panels 24. Conversely, once extended, the engagement arm 68 may retract back towards the rail assembly 56. The extension and retraction of the engagement arms 68 is actuated by an actuation mechanism, for example a winch mechanism (not shown) mounted on the rail assembly 56. It is envisaged that any actuation mechanism that permits the extension and retraction of the engagement arms 68 may be used. Examples of such mechanisms include hydraulic pistons and electric motor drive. Slide pins 74 are used to fix the tubes during extension and retraction of the extension tube 68. Whilst the embodiment shown in the Figures comprises a tube-in-tube design, it is envisaged that other configurations may be used. Such configurations includes two plate members slidingly engaged to one another. Alternatively, the engagement arms 68 could be provided in the form of plate members that extend from a solid body member.

As best seen in FIG. 2, an upper mounting aperture 76 and a lower mounting aperture 78 are provided through the ends of each the engagement arm 68. The upper mounting aperture 76 and the lower mounting aperture 78 are offset in a horizontal direction, with the upper mounting aperture 76 set back from the lower mounting aperture 78. The upper mounting aperture 76 and a lower mounting aperture 78 are adapted to engage with the rear face 27 of a skirting panel 24. The rear face 27 of each skirting panel 24 is provided with mounting plates 80. Each mounting plate 80 has provided therethrough an upper aperture 82 and a lower aperture 84. The upper aperture 82 is adapted to engage with the upper mounting aperture 76 of the engagement arm 68. Similarly, the lower aperture 84 is adapted to engage with the lower mounting aperture 78 of the engagement arm 68. It is envisaged that once the respective apertures are aligned, a locking pin (not shown) may be inserted to engage the skirting panel 24 to the trolley assembly 62. Given the offset positioning of the upper 76 and lower 78 mounting apertures, in order for the upper apertures to align, the skirting panel 24 must be rotated to a pivot position. It is envisaged that the pivot position assists in the removal of the skirting panels 24 from the conveyor 12.

Whilst the embodiment shown in the Figures utilises a lock pin mechanism to fasten the skirt panel 24 to the engagement arms 68, it is envisaged that other engagement mechanisms may be used. Such engagement mechanisms include vice grips or screw fasteners.

The rail assembly 56 further comprises a lateral rail track 80 orientated perpendicular to the direction of the rail track 58. Preferably, the lateral rail track 80 is in communication with the rail track 58, such that the trolley assembly 62 may move from the rail track 58 to the lateral rail track 60. In such a manner, the lateral rail track 60 allows for the trolley assembly 62 and the skirting panel 24 to be moved in a lateral direction relative to the transfer area 18 to permit repair or replacement of the wear liners 26.

FIGS. 3(*a*)-(*c*) illustrate the use of the conveyor skirt system 10. As shown in FIG. 3(*a*), a series of upper skirting panels 34 are fixed above a conveyor 12. A series of skirting panels 24 are fixed below the series of upper skirting panels 34. Each skirting panel 24 is fixed to its adjacent skirting panel 24. The conveyor 12 may operate normally, with the bulk material being retained in the transfer area 18 by the series of skirting panels 24. Eventually, the wear liners 26 on the skirting panels 24 will need to be repaired or replaced. The trolley assembly 62 will be rolled along the rail assembly 56 to a position adjacent to a defective skirting panel 24. The winch mechanism is then actuated and the engagement arms 68 are extended towards the rear face 27 of the skirting panel 24. The engagement arms 68 are extended until the lower mounting aperture 78 is aligned with the lower aperture 84 of the mounting plate 80. Once aligned, a locking pin (not shown) may be inserted through the lower apertures, thereby engaging the trolley assembly 62 to the skirting panel 24. Once engaged, the weight of the skirting panel 24 is supported by the trolley assembly 62 and the skirting panel 24 may be unfastened from the upper skirting panel 34 and the adjacent skirting panels 24.

As shown in FIG. 3(*b*), the skirting panel 24 is then rotated to a pivot position, where the upper mounting aperture 76 is aligned with the upper aperture 82 of the mounting plate 80. Once aligned, a locking pin (not shown) may be inserted through the upper apertures, thereby retaining the lower skirt panel in the pivot position and further engaging the trolley assembly 62 to the skirting panels 24.

As shown in FIG. 3(*c*), the winch mechanism 70 is then actuated, preferably by an operator, to retract the engagement arms 68 and the skirting panel 24 towards the trolley assembly 62. Once the engagement arms 68 are retracted to a position where the skirting panel 24 is clear of the rest of the assembly, the trolley assembly 62 and the skirting panel 24 are free to roll along the rail assembly 56. Advantageously, once the trolley assembly 62 is clear of the conveyor 12, simple and safe repair/replacement of the wear liner 26 can be undertaken. Furthermore, the entire repair/replacement process can be performed from outside the transfer area 18, reducing the risk of injuries to operators.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A conveyor skirt system, the system comprising:
   a support member fixed relative to the conveyor;
   a series of skirting panels releasably fixed to the support member;
   a rail assembly positioned outside the conveyor, extending in a direction substantially parallel to the direction of the conveyor; and
   a trolley assembly mounted on the rail assembly, the trolley assembly being adapted to engage and support one or more of the skirting panels.

2. The conveyor skirt system according to claim 1, wherein each skirting panel has a wear liner attached thereto.

3. The conveyor skirt system according to claim 1, wherein the arrangement of the trolley assembly and the rail assembly allows the trolley assembly to run along the length of the rail assembly in either direction.

4. The conveyor skirt system according to claim 1, wherein the support member fixed relative to the conveyor.

5. The conveyor skirt system according to claim 1, wherein the rail assembly comprises one or more rail tracks.

6. The conveyor skirt system according to claim 1, wherein the trolley assembly comprises a rail assembly engaging portion and a skirting panel engaging portion.

7. The conveyor skirt system according to claim 6, wherein the rail assembly engaging portion is adapted to engage and move along the rail assembly.

8. The conveyor skirt system according to claim 6, wherein the skirting panel engaging portion is adapted to engage a skirting panel.

9. The conveyor skirt system according to claim 6, wherein the skirting panel engaging portion comprises one or more engagement arms.

10. The conveyor skirt system according to claim 9, wherein the one or more engagement arms are adapted to engage a skirting panel.

11. The conveyor skirt system according to claim 9, wherein the one or more engagement arms are adapted to extend and retract.

12. A conveyor skirt system according to claim 1, wherein each skirting panel is provided with one or more attachment means.

13. The conveyor skirt system according to claim 12, wherein each attachment means is adapted to be engaged by the trolley assembly.

14. The conveyor skirt system according to claim 12, wherein each attachment means comprises a mounting aperture adapted for engagement with the trolley assembly.

15. The conveyor skirt system according to claim 14, wherein the mounting aperture is adapted for engagement with the one or more engagement arms.

16. The conveyor skirt system according to claim 1, wherein the skirt panels depend from the support member.

17. The conveyor skirt system according to claim 1, wherein each skirting panel is releasably fixed to the adjacent skirting panel.

18. The conveyor skirt system according to claim 1, wherein the rail assembly further comprises a lateral rail track orientated perpendicular to the direction of the rail track.

19. The conveyor skirt system according to claim 18, wherein the lateral rail track is in communication with the rail track, such that the trolley assembly may move from the rail track to the lateral rail track.

20. A method for replacing a wear liner on a skirting panel of a conveyor, the method comprising the step of:
  positioning a trolley assembly mounted on a rail assembly adjacent to the skirting panel with the wear liner to be replaced fastened thereto;
  engaging the skirting panel with the trolley assembly and unfastening the skirting panel from the conveyor;
  moving the trolley assembly and the skirting panel along the rail assembly to a position clear of the conveyor;
  replacing the skirting panel and/or the wear liner;
  moving the trolley assembly and the skirting panel along the rail assembly to a position suitable for mounting; and
  fastening to the skirting panel to the conveyor.

* * * * *